United States Patent [19]

Tucker

[11] 3,773,985

[45] Nov. 20, 1973

[54] TELEPHONE ACTUATING MECHANISM

[75] Inventor: Council A. Tucker, Glendale, Calif.

[73] Assignee: American Telecommunications Corporation, El Monte, Calif.

[22] Filed: Jan. 3, 1972

[21] Appl. No.: 214,887

[52] U.S. Cl. .............................. 179/164, 179/100 D

[51] Int. Cl. .............................. H04m 1/08

[58] Field of Search .................... 179/164, 165, 166, 179/100 R, 100 D, 159, 160, 161, 178

[56] References Cited

UNITED STATES PATENTS

| | | | |
|---|---|---|---|
| 931,179 | 8/1909 | Birsfield | 179/164 |
| 672,662 | 4/1901 | Andriano | 179/165 |
| 1,083,406 | 1/1914 | Knight et al. | 179/164 |
| 1,277,840 | 9/1918 | Blessing | 179/165 |
| 1,379,557 | 5/1921 | Gray | 179/164 |
| 1,388,703 | 8/1921 | Gray | 179/164 |
| 1,524,278 | 1/1925 | Apler | 179/164 |
| 2,063,009 | 12/1936 | Andriano | 179/164 |

*Primary Examiner*—Kathleen H. Claffy
*Assistant Examiner*—Randall P. Myers
*Attorney*—Robert L. Parker et al.

[57] ABSTRACT

An upright telephone has a base housing with a column extending vertically from the housing. A guide tube extends coaxially within the column from the base housing to a top closure cap which mounts a transmitter. The entire assembly between the housing and the cap is loaded in compression by the guide tube, and the loaded assembly is held together by this compressive load. The guide tube also serves to vertically orient an actuator and as a conduit for conductors from between the transmitter and the base. A receiver hook extends from a pivotal mounting in the column for cradling a receiver.

15 Claims, 9 Drawing Figures

TELEPHONE ACTUATING MECHANISM

BACKGROUND OF THE INVENTION

The present invention relates to telephone instruments, and, in particular, to an improved housing for a telephone of the type generally known as an upright or desk telephone which is characterized by structural integration of a column assembly and concomitant facile production and assembly.

Upright telephones which were once universally used have been virtually replaced by more modern cradle telephones. However, because of the sentimental appeal of upright telephones, a desired to have a different and distinctive telephone, and for decorative reasons, there has been a revived interest in upright telephones.

An upright telephone has a base which contains the telephone's switching device. The telephone dial is on a sloping surface of the base. An upright column extends vertically from the base to a transmitter. A receiver is cradled in a hook which for its part is pivotally mounted near the top of a column. When the receiver is lifted off the hook the switching device is actuated such that a telephone call can be placed, or, in the case of an incoming call, the telephone can be answered. Thus the receiver hook is coupled to the switching device by some form of actuator.

Unfortunately the type of upright telephone construction of the past is unacceptable today if use is to be made of the electromechanical equipment presently available and which has evolved through experience with cradle telephones. More specifically, it is obviously highly desirable to incorporate the standard transmitter, receiver and switching mechanisms in an updated version of an upright telephone. It is also highly desirable to provide an improved upright telephone, the parts of which are easily produced, which is easy to fabricate, and which has considerable durability. The fabrication of an upright telephone from modern plastic material presents problems in meeting these criteria.

SUMMARY OF THE INVENTION

The present invention provides an improved upright telephone construction which employs presently available electromechanical transmitters, receivers and switching devices. The telephone of the present invention is marked by its durability, ease of construction and ease of assembly. A characteristic of the present telephone construction is in the manner that the column and associated members are integrated together by a unique tension-compression loading of the components.

More specifically, the present invention contemplates a telephone enclosure of the type having a base housing adapted to contain the telephone switching mechanism. The vertical column is secured to the base housing and mounts a transmitter housing for a telephone's transmitter. A receiver hook is pivotally secured in the column for pivotal movement between a first and a second position in response, respectively, to the weight of a receiver supported by the hook and the absence of such weight. The telephone enclosure includes the receiver which is normally cradled by the receiver hook. An actuator is in the column between the receiver hook and the switching mechanism in the base housing and is capable of translational movement in the column between first and second positions in response to pivotal movement of the hook between its first and second positions. Translational movement of the actuator operates switches of the switching mechanism. Biasing means urge the hook and actuator into the position they occupy without the weight of the receiver, and when the receiver is not being carried by the hook the biasing means forces the hook and the actuator into that position.

The improvement includes a tension member in the column which is coupled to a cap on the column for compressively loading the cap. The cap mounts the transmitter housing. The tension member is coupled through the base housing by means such as a fastener to the bottom of the column. Means are similarly provided for compressively loading the top of the column through the cap by the tension member. In the construction, the cap and column are loaded in compression and the tension member is loaded in reactive tension, and these three members are secured together and secured to the base by such loading.

It is preferred that the base housing have an opening bounded by an annular flat wall. A base adapter is provided which has a shoulder abutting against the annular wall of the base housing. The base adapter also has a longitudinally extending extension adjacent the shoulder and disposed within the opening and an annular groove at its upper end. The column is received in the annular groove of the base adapter and is capped by an insert member which has an external flange abutting the upper end of the column. The insert member has a depending pivot for the receiver hook. A cap mounts the transmitter. The cap has a circumferential bead overlying the upper end of the column and an interior annular shoulder extending from the bead and abutting the annular flange of the insert. The tension member takes the form of a guide tube which extends axially from the hole in the base housing through the base adapter, column, insert and cap. The guide tube has a flared top in compressive engagement with a cooperating surface of the cap. Fastener means between the guide tube and the base housing load the guide tube in tension and provide the reactive coupling for loading the column, cap, insert member and base adapter in compression, and, with such loading, securing these elements together as well as securing them to the base housing. The guide tube contains the electrical conductors between the transmitter and the switching device in the base housing. The actuator and receiver hook are external of the guide tube and consequently there is an isolation between purely mechanical and purely electrical parts.

With this construction a very rigid column assembly is effected and no other means mounting the column, cap and transmitter to the base housing is necessary.

An attendant advantage with the tension compression assembly is the ease of assembling the parts in the assembly and the ease of their construction.

A presently preferred embodiment of the present invention provides an actuator which has an arc-shaped cross section to provide rigidity and a pair of spaced-apart, ring-like members received by the guide tube and determining the position of the actuator relative to the axis of the guide tube. The actuator is topped by a vertically extending projection which nests in a recess in the bottom of the actuator hook to thereby provide the couple between the two. In the preferred construction, the hook is pivotally mounted in the column without the use of pivot pins or the like. This is effected, preferably, by a depending horizontal projection or protrusion of the insert member on the side of the column diametrically opposite from a longitudinal slot through which an arm of the receiver extends. The protrusion is flanked by spaced-apart and vertically extending side walls of the insert member. Inside the column the receiver hook is enlarged and has an opening therethrough receiving the guide tube. On the inner end of the receiver hook a hook-like portion is defined which rests in pivot bearing on the protrusion of the insert member. To afford sideways stabilization of the receiver hook the side walls of the insert member are received in notches of the hook adjacent the hook-like pivot portion thereof. The receiver hook can then abut the side walls to prevent sideways motion. The receiver hook is also sideways stabilized by the arm abutting walls of the slot through which the arm extends. The enlarged inner portion of the receiver hook within the column is larger than the slot and approximates the slot. Accordingly, withdrawal of the hook outwardly of the slot is prevented by the hook itself engaging the column.

These and other features, aspects and advantages of the present invention will become more apparent from the following description, appended claims and drawings.

Figures 1, 2, 3, 4:
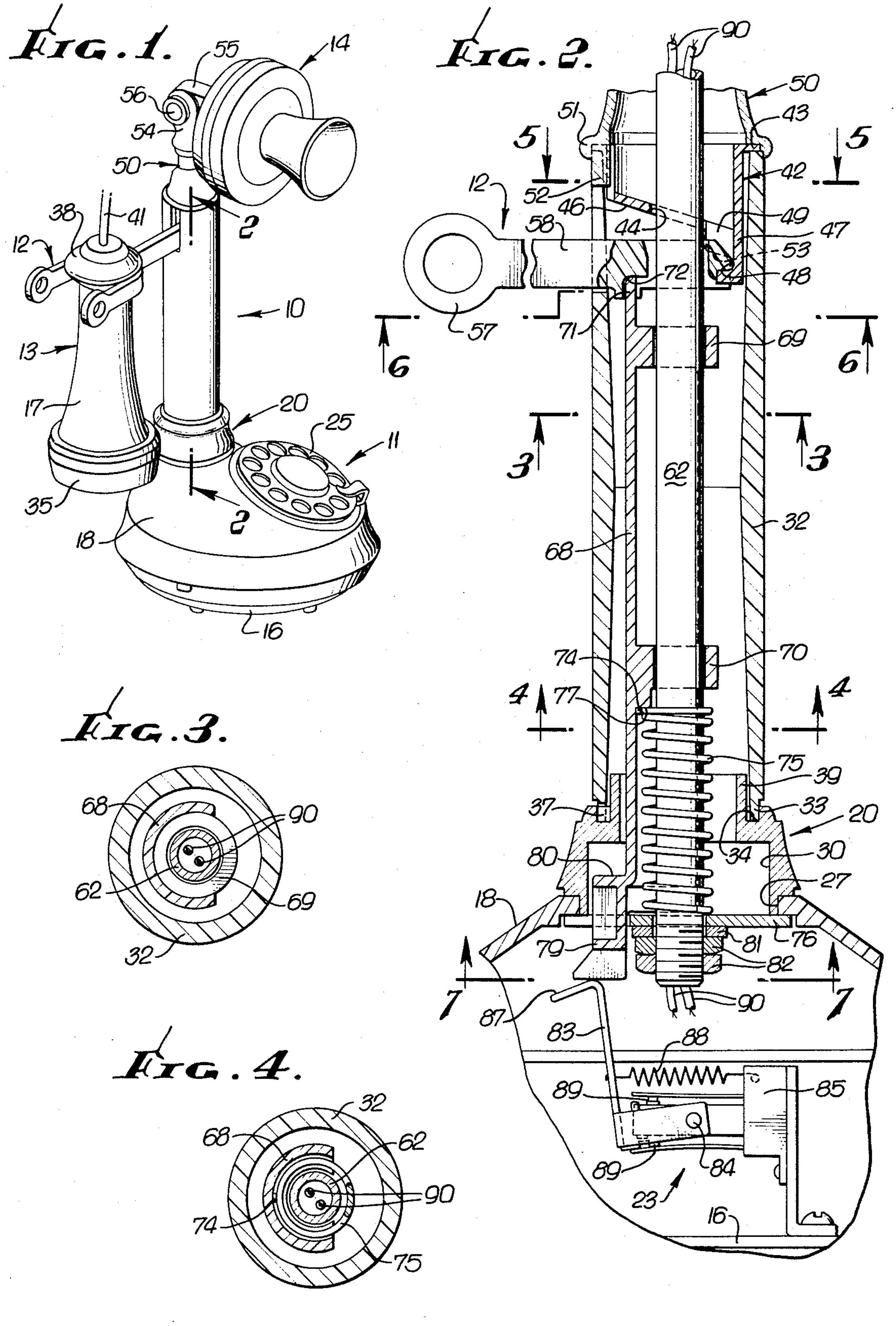
FIG. 1 is a perspective view of a telephone instrument in accordance with the present invention.
FIG. 2 is a vertical cross-sectional view through the column of the telephone and a portion of the base thereof as taken along line 2—2 in FIG. 1.
FIG. 3 is a horizontal cross-sectional view of the central portion of the column as taken along the line 3—3 of FIG. 2.
FIG. 4 is a horizontal cross-sectional view of the lower portion of the column as taken along the line 4—4 of FIG. 2.

Referring to the drawings, a complete upright telephone instrument in accordance with the present invention is shown in FIG. 1 to include a column assembly 10, a base assembly 11, a hook 12 and a receiver 13, and a transmitter assembly 14.

The base assembly 11 includes a base 16, a base housing 18 and a base adapter 20. The base 16 is essentially flat and receives and supports, on its upper surface, an electromechanical switching device 23. The base housing 18 is a pedestal-shaped hollow housing which encloses the switching device 23 on the base 16. The base housing 18 has a sloping front upper portion with an opening 24 in which a dial mechanism 25 is received. The top of the base housing 18 forms a horizontally disposed circular opening 27 which is annularly bounded by a flat wall portion 28.

The base adapter 20 having a generally ring-shaped configuration has its bottom end inserted in the circular opening 27 in the top of the base housing 18. Notches 29 on the diametrically opposite corners of the bottom end of the base adapter 20 engage similarly placed inward projections 31 on the circular opening 27 to secure the base adapter 20 in position in the base housing 18.

A tubular column 32 has its reduced diameter lower end 33 positioned in an annular groove 34 provided on the upper end of the base adapter 20. The lower end 33 of the column 32 is provided with a notch 36 which engages a projection 37 located within the annular groove 34. The outer wall of the base adapter 20 is flared outwardly toward its lower end so that the interior of the base adapter 20 below the annular groove 34 forms a cylindrical cavity 30 whose inside diameter is approximately equal to the outside diameter of the column 32. The inner wall of the base adapter 20 which lies radially within the annular groove 34 is identified by reference numeral 39 and it projects upwardly further than does the outer wall of the base adapter 20 so as to provide a firm support for the column 32.

Extending down from the top of the tubular column 32 is a vertically disposed rectangular slot 40. Positions on the top of the column 32 is a top insert member 42. The circular upper end of the member 42 is provided with a flange 43 which rests on the top end of the column 32 when the body portion of the member 42, having an outer diameter slightly smaller than the inner diameter of the interior of tubular column 32, is inserted within the column 32. A rectangular slot 45 having a width corresponding to the width of the slot 40 in the column 32 and aligned therewith extends a short distance down form the top of the member 42. The bottom 46 of the insert member 42 extends downwardly at an angle from the bottom of its slot 45 toward the diametrically opposite side of the insert member 42. A central opening 44 is provided in the bottom 46. A depending portion 47 of the member 42 located at a level opposite the bottom of slot 40 of the column 32 forms a horizontally disposed side notch 48. The side notch is defined by a horizontal protrusion or projection of the insert member.

Extending into the rectangular slot 40 on the column 32 is the arm 58 of the hook 12. The inner end of the arm 58 opposite the outer forked end 57 thereof fans out to form the parallel sides of an enlarged, generally rectangularly shaped end portion 60 of the hook which is located within the column 32. The end portion 60 is provided with a central opening 59. The rear edge 61 of the end portion 60 is shaped to be nested in the horizontal side notch 48 on the depending portion 47 of the top insert member 42. The end portion 60 of the hook 12 is of such a size that its inner edge 73 (FIG. 6) has a fairly close fit within the opening of column 32 thus constraining its rear edge 61 within the horizontal side notch 48 on the depending portion 47 of the insert member 42. Furthermore, the vertical sides 49 of the depending portion 47 fit in upper side recesses 67 provided in the rear edge 61 of the end portion 60. The hook 12 thus has its end portion 60 joined to the side notch 48 in the depending portion 47 of the top insert member 42 so that it is restrained from any sidewise relative movement thereto. However, the vertical slot 40 on the column 32 permits the hook 12 to be pivoted in the side notch 48 from a horizontal position with its arm 58 adjacent the bottom of the slot 40 on the column 32 to an upwardly inclined position with its arm 58 positioned against the inclined bottom 46 of the insert member 42.

It should be noted that the top insert member 42 with the end portion 60 of the hook 12 already positioned in the notch 48 on the depending portion 47 thereof is assembled as a unit on the top of the column 32 by permitting the arm 58 to move down through the vertical slot 40.

Positioned on the top of the tubular column 32 is a cap 50. The lower end of the cap 50 is provided with an outer circumferential bead 51, the inner surface of which matingly engages the end face of the column 32 and the flange 43 on the top of the insert member 42. A tongue 52 depending from the bottom of the bead 51 fits between the opening provided by the aligned rectangular slots 40 and 45 on the column 32 and the insert member 42, respectively.

A metal guide tube 62 passes down to an opening 67 in the center of the cap 50. The upper end 63 of the guide tube 62 is flared and formed with a projection 64 which fits in a notch 65 in the upper end of the central opening 67 in the cap 50. The guide tube 62 passes on down into the column 32 through the opening 44 of the top insert member 42 and the opening 59 of the generally rectangularly shaped end portion 60 of the hook 12 so as to extend out below the bottom of the base adapter 20 into the base housing 18.

An actuator sleeve 68 is positioned up into the column 32 by way of the circular opening 27 in the base housing 18. The sleeve 68 has a pair of vertically spaced upper and lower ring shaped walls 69 and 70 which slide along the guide tube 62 and hold the sleeve 68 in a vertical position. The upper end of the sleeve 68 is provided with a vertical projection 71 which fits into a recess 72 provided on the lower surface of the inner edge 73 of the generally rectangularly shaped end portion 60 of the hook 12. The lower end of the sleeve 68 is integrally formed with a boss 80 having a projection 79 depending from the side thereof. The projection which includes spaced parallel members 86 extends into the cylindrical cavity 30 formed within the base adapter 20. With the sleeve 68 so positioned in the column 32 a compression spring 75 is then inserted over the lower end of the guide tube 62 so that the upper end of the spring 75 contacts an internal shoulder 77 formed below the lower ringed-shaped wall 70 on the sleeve 68. A small arcuate tab 74 depending from the shoulder 77 together with the adjacent inner wall of sleeve 68 forms a concentric groove in which the upper end of the spring 75 is seated. The spring 75 is thus concentrically held within the sleeve 68 so as to freely encircle the guide tube 62.

With the spring 75 positioned on the lower portion of the guide tube 62 compressed upwardly, a circular flat washer 76 having a larger diameter than the circular opening 27 in the base housing 18 is positioned over the lower threaded end of the guide tube 62. The washer 76 is provided with a cutout portion 78 extending radially inward from the edge thereof through which the projection 79 on the lower end of the sleeve 68 extends. A lock washer 81 and nuts 82 are then placed on the threaded end of the guide tube 62.

It should now be clear that with the flared upper end 63 of the guide tube 62 seated in the central opening 67 of the cap 50 and with the washer 76 on the lower end of the guide tubes 62 butting up against the lower surface of the circular opening 27 in the base housing 18, a tightening of the nuts 82 on the lower threaded end of the guide tube 62 provides for securing together the parts of the actuating mechanism assembled within the column 32. In particular, the top insert member 42 is held within the top opening of the column 32 and the lower end of the compression spring 75 is held against the top surface of the washer 76.

After the actuating mechanism has been thus assembled in the column 32, a shank 55 of the transmitter assembly 14 is positioned between a pair of spaced ears 54 on the upper end of the cap 50. The shank 55 is pivotally held in position on the cap by a pin 56. A continuous passageway extends from the interior of the transmitter assembly 14 through its shank 55 and the top cap 50 down through the guide tube 62 within the column 32 to the base 16 to enable electrical conductors 90 to extend from the transmitter assembly 14 to the switching device 23 mounted on the base 16.

It should be noted that the tubular column 32 and the base housing 18 are preferably formed from relatively rigid plastic material. Likewise the top cap 50, the top insert member 42, the hook 12, the actuator sleeve 68 and the adapter 20 are each preferably integrally formed of a similar plastic material.

The receiver 13 includes a receiver housing 17 which is of a generally cylindrical configuration but flared outwardly to a larger diameter at its lower end. An earpiece 35 is attached to the enlarged lower end of the receiver housing 17 and a hook-fitting 38 is attached to the small or upper end of the receiver housing. An electrical cord 41 connects the upper end of the receiver 13 to the base 16 of the telephone. The parts comprising the receiver 13 are likewise preferably formed from relatively rigid plastic material.

Reference will next be made to the electromechanical switching device 23 mounted on the base 16 within the base housing 18. The switching device 23 includes an upwardly extending arm 83 which is connected to be pivoted about a pin 84 on a terminal box 85. The arm is formed of a flat narrow strip of metal and the upper end is bent at an angle so as to provide a flat upper surface 87 adjacent the projection 79 provided on the bottom of the boss 80 forming the lower end of the actuator sleeve 68. A switch spring 88 has one end attached to the arm 83 and the other end attached to the terminal box 85 for holding the arm 83 normally in its upright position.

Figures 5, 6, 7, 8:
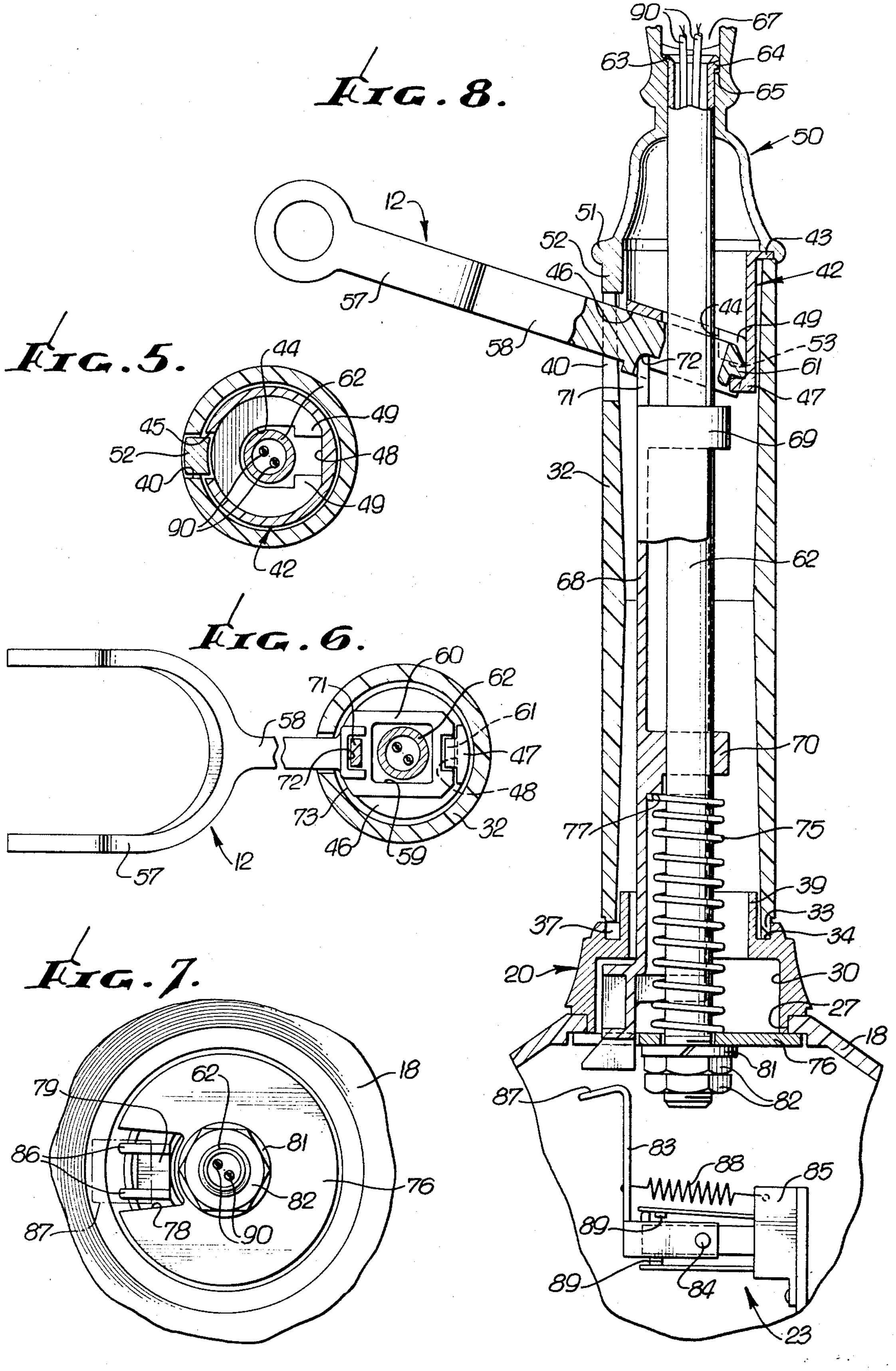
FIG. 5 is a horizontal cross-sectional view near the top of the column as taken along line 5—5 of FIG. 2.
FIG. 6 is a view showing the coupling of the end of th hook to the top insert member located within the column as taken along line 6—6 of FIG. 2.
FIG. 7 is a view showing the projection on the lower end of the actuator sleeve extending into the base housing as taken along line 7—7 of FIG. 2.
FIG. 8 is a vertical cross-sectional view through the column, similar to FIG. 2, but with the hook in its raised position as a result of the receiver being lifted therefrom.
Figure 9:
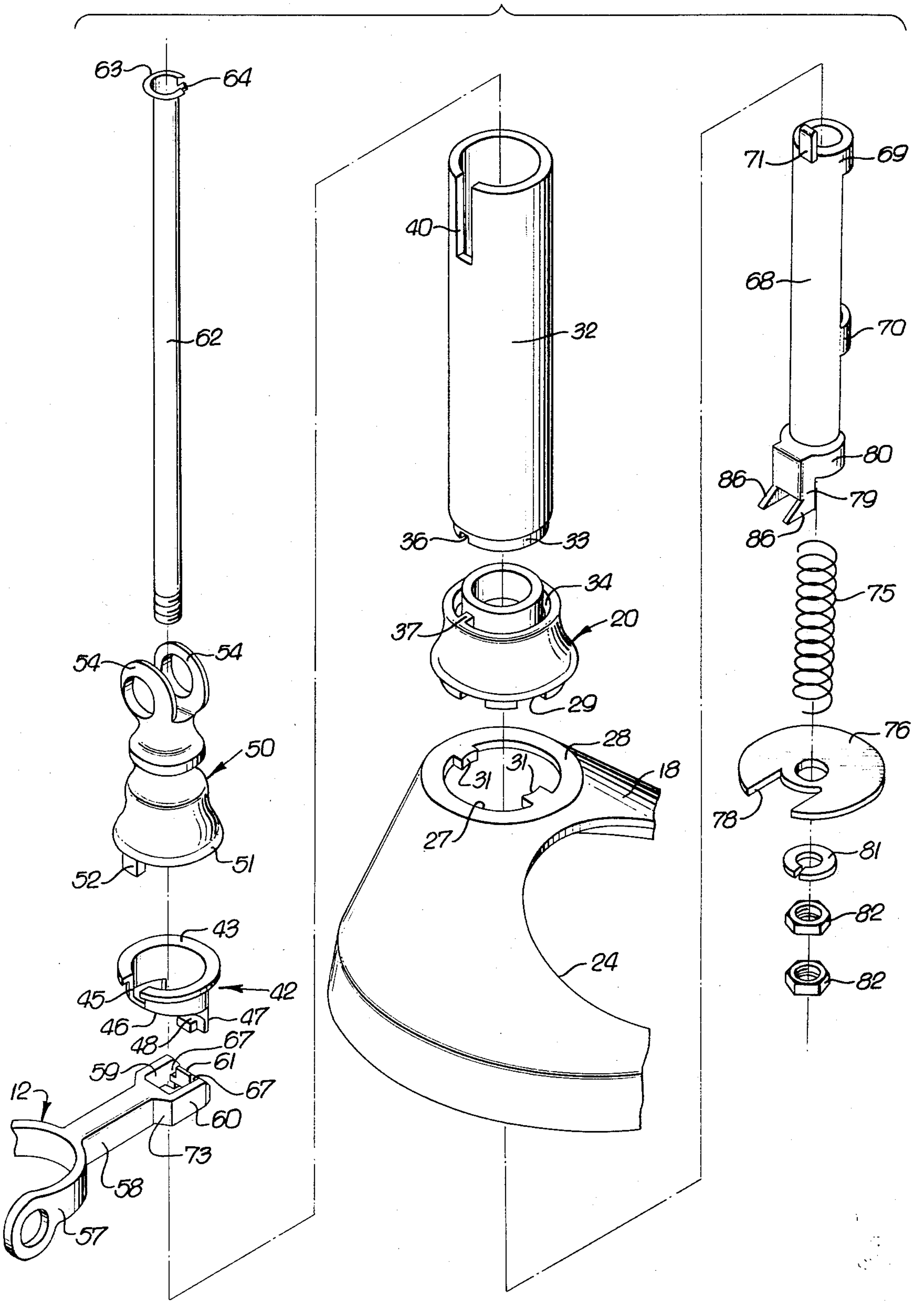
FIG. 9 is an exploded perspective view showing the component parts of the actuating mechanism housed within the column of the telephone instrument.

As shown in FIG. 8, when the receiver 13 is off the hook 12 compression spring 75 forces the actuator sleeve 68 to move upwardly such that the projection 71 on the upper end thereof which is engaged in the lower recess 72 formed on the inner edge 73 of the end portion 60 causes the arm 58 of the hook 12 to pivot upwardly on the outer edge 61 of its end portion 60 about the notch 48 of insert member 42. It should be noted that when the hook 12 is thus subjected to an upward force the outer edge 61 thereof is restrained by the upper surface 53 of the notch 48. The arm 58 is pivoted upwardly about notch 48 until it contacts the inclined bottom 46 of the top insert member 42 whereby the lower projection 79 on the sleeve 68 is retracted to its upper vertical position thus enabling the switch spring 88 to urge the switch arm 83 to be pivoted clockwise about the pin 84 to its generally upright position which provides for opening and/or closing a series of leaf contacts 89 comprising the electromechanical switching device 23.

As shown in FIG. 2, when the receiver 13 is placed on the forked end 57 of hook 12, the hook 12 is vertically swung within slot 40 downwardly about the notch 48 on insert member 42, thus causing the actuator sleeve 68 to move downwardly against the action of compression spring 75 so that the projection 79 on the lower end of the sleeve 68 contacts the flat top surface 87 of the switch arm 83 with sufficient force and vertical movement to cause the arm 83 to be rotated counterclockwise about its pivot pin 84 against the action of the switch spring 88 so as to switch the series of leaf contacts 89 to their opposite switching position.

It should now be clearly understood that the sleeve 68 is slideably held within the column 32 on the guide tube 62 by its upper and lower ring-shaped walls 69 and 70. The compression spring 75 contacts the internal shoulder 76 on the sleeve 68 to urge the sleeve 68 upwardly.

When the receiver 13 is placed on the forked end 57 of the hook 12 the inner end of the hook pivots about the notch 48 on the depending portion 47 of the insert member 42 causing the actuator sleeve 68 whose upper projection 71 contacts the lower inner edge 73 of the end portion 60 of hook 12 to be moved down against the action of spring 75, thus moving the projection 79 on the lower end of the sleeve 68 to the lower end of its vertical stroke.

When the receiver 13 is lifted from the forked end 57 of the hook 12, the compression spring 75 forces the actuator sleeve 68 upwardly. The projection 71 on the upper end of the sleeve 68 contacting the lower recess 72 on the inner edge 73 of the end portion 60 forces hook 12 to pivot on its outer edge 61 about the notch 48 on the depending portion 47 of the insert member 42 thus moving the projection 79 on the lower end of the sleeve 68 to the upper end of its vertical stroke.

It should now be clear that the leverage arrangement of the hook 12 within the column 32 provides for pivoting the hook 12 on its rear edge 61 about the notch 48 provided adjacent a point on the side of the interior wall of the column which is diametrically opposite the location of the vertical slot 40 so as to provide the maximum leverage action for the weight of the receiver 13 when placed on the forked end 57 of the hook 12. The upper projection 71 on the actuator sleeve 68 then provides for contacting the hook at a point adjacent the side of the interior wall of the column formed with the slot 40 which point is located diametrically opposite the pivot point of the hook. With such a lever arrangement the force on the upper projection 71 of the sleeve 68 and therefore the force on the flat face 87 of the switch arm 83 is sufficient to actuate the switching device 23. Moreover with such a leverage arrangement the vertical movement of the lower projection 79 on the sleeve 68 is sufficient to operate the switching device 23.

While the invention has been concerned with a particular embodiment of the present invention it is to be understood that many modifications and variations in the construction and arrangement thereof may be provided for without departing from the spirit and scope of the invention or sacrificing any of its advantages. The invention is therefore considered an including all such possible modifications and variations coming within the legitimate and valid scope of the claims.

Having described the invention what is claimed as new in support of Letters Patent is:

1. In a telephone enclosure of the type having a base housing adapted to contain the telephone's switching mechanism, a column secured to the base housing and extending vertically therefrom, a transmitter housing secured to the top of the column, a receiver housing, a receiver hook normally supporting the receiver housing and being pivotally mounted in the column for pivotal movement between a first and a second position in response, respectively, to the weight of the receiver housing supported by the hook and the absence of such weight, an actuator disposed in the column and coupled to the hook for translational movement in response to pivotal movement of the hook between a first and a second position corresponding, respectively, to the first and second positions of the hook and for operating switch means of the switching mechanism upon such movement, biasing means urging the hook and the actuator into their second positions, an improvement which comprises:

a. a tension member in the column;

b. a cap on top of the column carrying the transmitter housing;

c. means for compressively loading the bottom of the column by the tension member through the base housing;

d. means for compressively loading the top of the column through the cap by the tension member, the tension member being loaded in tension by the compressive loading of the bottom and top of the column; and e. the cap, column and tension member being secured together and to the base housing by the compression and the tension loads.

2. The improvement claimed in claim 1 wherein:

the column has a longitudinal slot;

the hook has an arm extending through the longitudinal slot and an aperture within the column receiving the tension member; and the pivot of the hook is on an interior side of the column diametrically opposite the slot.

3. The improvement claimed in claim 2 wherein the pivot of the hook is defined by:

an inwardly extending projection attached to the column; and a rear edge of the hook bearing on an upper surface of the projection and providing the pivotal mounting of the hook.

4. The improvement claimed in claim 3 wherein:

the hook has a pair of spaced-apart vertical recesses flanking the rear edge thereof;

a pair of vertical members attached to the column received in the recesses of the hook prevent sideways movement of the rear end of the hook with respect to the column;

the arm of the hook and the slot of the column prevent sideways movement of the arm;

the hook has an enlarged portion within the column having the aperture; and a front surface of the enlarged portion being proximate the column about the slot to prevent movement of the hook outwardly of the column by abutting the column.

5. The improvement claimed in claim 1 wherein the actuator has:
a. an arc-shaped cross section along a substantial portion of its length; and
b. laterally extending means receiving the tension member and vertically orienting the actuator thereby.

6. The improvement claimed in claim 4 wherein:
a. the actuator has an arc-shaped cross section along a substantial portion of its length, laterally extending means receiving the tension member and vertically orienting the actuator thereby, and a vertical projection on the diametrically opposite side of the column from the hook's pivot;
b. the hook has a recess receiving the vertical projection of the actuator, the hook and the actuator being coupled thereby; and
c. the biasing means acts directly on the actuator.

7. An improved upright telephone comprising:
a. a base containing the telephone's switching mechanism;
b. a vertical column;
c. a cap;
d. a transmitter secured to the top of the cap;
e. a guide tube within the column and coaxial therewith;
f. conductors from the transmitter to the switching mechanism through the guide tube;
g. a receiver;
h. a receiver hook pivotally mounted in the column for pivotal movement between a first and a second position in response, respectively, to the weight of the receiver carried by the hook and the absence of such weight, the receiver normally carrying the hook;
i. an actuator in the column and coupled to the hook for translation between a first and a second position in response to pivotal movement of the hook between its first and second positions, respectively, the actuator also being coupled to the switching mechanism to operate a switch thereof with actuator translation;
j. biasing spring means surrounding the guide tube and acting on the actuator to urge it and the hook to their second positions;
k. means for compressively loading the cap by the guide tube and the top of the column by the cap to secure the cap to the column thereby; and
l. means for compressively loading the bottom of the column through the base by the guide tube to secure the column to the base thereby, the compressive loads applied by the guide tube being balanced by an equal and opposite tension load in the guide tube so that the loaded components are in static equilibrium.

8. The improved telephone claimed in claim 7 wherein:
a. the column has a vertical slot extending from the top thereof;
b. the receiver hook has a forked outer end for carrying the receiver, an arm secured to the forked end and received in the slot, the walls of the slot preventing sideways movement of the arm, an inner end in the column having a central opening receiving the guide tube, a surface proximate the slot for preventing movement of the hook outwardly through the slot, and a rear edge diametrically opposite the slot;
c. means defining a projection in the column diametrically opposite the slot, the rear edge of the hook resting on the projection means and defining therewith the pivot of the hook;
d. means for abutting the inner end of the receiver hook proximate the rear edge for preventing sideways movement thereof; and
e. the actuator being coupled to the hook proximate the slot and diametrically opposite the pivot of the hook.

9. The improved telephone claimed in claim 8 wherein:
a. the hook has a recess in a lower wall thereof proximate the slot; and
b. the actuator has a vertical projection in the recess of the hook, the actuator and hook being coupled together thereby.

10. The improved telephone claimed in claim 7 wherein:
the actuator has a pair of vertically spaced-apart means for receiving the guide tube, the actuator being prevented from horizontal, nonrotational movement thereby.

11. The improved telephone claimed in claim 10 wherein:
a. the column has a vertical slot proximate the top thereof;
b. the receiver hook has a forked outer end for carrying the receiver, an arm extending from the forked outer end through the slot and being sideways stabilized by the walls of the slot, an inner end in the column having a surface proximate the slot for abutting against the column and preventing movement of the hook in a direction outwardly through the slot, an opening receiving the guide tube, and a rear edge diametrically opposite the slot;
c. means in the column defining a projection diametrically opposite the slot supporting the rear edge of the receiver hook and defining therewith the pivot of the hook;
d. means in the column for stabilizing the inner end of the hook proximate the pivot against sideways movement; and
e. the actuator being coupled to the hook by engagement therewith proximate the slot and diametrically opposite the pivot of the hook.

12. An improved telephone comprising:
a base;
a base housing on the base for housing a switching device of the telephone and having an opening with an annular wall bounding the opening;
a base adapter having a shoulder abutting against the annular wall of the base housing, an extension adjacent the shoulder within the opening of the base housing, and an annular groove at an upper end thereof;
a hollow column vertically received in the annular groove of the base adapter and having a longitudinal slot proximate an upper end of the column;
a top insert member having an annular external flange abutting the upper end of the column and a depending pivot diametrically opposite the longitudinal slot and proximate an interior wall of the column;

a cap having a circumferential bead overlying the upper end of the column and an interior annular shoulder extending from the bead and abutting the annular flange of the insert;

a guide tube extending axially from the hole in the base housing through the base adapter, column, insert and cap, the guide tube having a flared top in compressive engagement with a cooperating surface of the cap;

fastener means between the guide tube and the base housing loading the guide tube in tension and, through the base housing and the flared top, the cap, insert member, column and base adapter in compression, the tension and compression loads securing the base housing, base adapter, column, cap and guide tube together;

a receiver hook extending through the slot of the column into the inside thereof being pivotally supported on the pivot of the insert member, having a hole therethrough receiving the guide tube, and having a forked end outside the column for cradling a receiver;

an actuator translationally disposed in the column for movement between a lower and an upper position, the actuator having an upper end diametrically opposite the pivot bearing against the hook, a pair of ring-shaped walls receiving the guide tube to hold the actuator to the guide tube, and a lower end extending into the housing for operating a switch of the switching device with the movement of the actuator;

a spring receiving the guide tube and biasing the actuator and hook upwardly into the actuator's upper position;

a receiver normally cradled in the forked end of the hook to hold the hook in a down position and the actuator in its lower position;

a transmitter mounted on the cap; and electrical conductors in the tube between the transmitter and the switching device.

13. The improved telephone claimed in claim 12 wherein:

the insert member pivot is defined by a horizontal protrusion, the insert member has a pair of spaced-apart side walls flanking the protrusion and a sloping bottom portion extending diagonally from the protrusion upwardly across the column;

the receiver hook on the inside of the column has a hook-like portion bearing on the insert member protrusion and providing the pivot support of the receiver hook, a pair of notches flanking the hook-like portion, the side walls of the insert member being received in the receiver hook notches and providing sideways stabilization of the inner end of the receiver hook by acting as stops for the receiver hook;

the walls of the slot in the column providing sideways stabilization for the receiver hook by providing stops for the receiver hook; and an end of the rectangular portion being capable of abutting the wall of the column proximate the slot to prevent movement of the receiver hook outwardly of the column.

14. The improved telephone claimed in claim 13 wherein the receiver hook has a recess on a bottom side thereof inside the column and opposite the pivot, and the actuator has a projection received in the recess and coupling the actuator with the receiver hook.

15. The telephone claimed in claim 14 wherein the actuator for a substantial portion of its length has an arc-shaped cross section.

* * * * *

PO-1050
(5/69)

UNITED STATES PATENT OFFICE
CERTIFICATE OF CORRECTION

Patent No. 3,773,985 Dated Nov. 20, 1973

Inventor(s) Council A. Tucker

It is certified that error appears in the above-identified patent and that said Letters Patent are hereby corrected as shown below:

The title should be: Column Construction For An Upright Or Desk Telephone

In the specification: Column 1, line 13, "desired" should be --desire--. Column 3, lines 21 through 23, delete last sentence of the paragraph; line 43, "th" should be --the--. Column 4, line 28, "Positions" should be --Positioned--; line 38, "form" should be --from--.

Column 8, line 1, "an" should be --as--.

In the claims: Claim 4, column 8, line 59, after "column;" insert --and--; line 61, delete the semi-colon and insert therefor a period --.--; delete lines 62 through 67 in their entirety. Claim 7, column 9, line 35, "carrying" should be --being carried by--. Claim 8, column 9, line 66, delete "a surface proximate the slot for"; line 67, delete in its entirety. Claim 8, column 10, line 1, delete "through the slot,". Claim 11, column 10, line 34, delete "an inner end in the"; lines 35 through 37, delete in their entirety; line 38, delete "the slot,". Claim 13, column 12, line 20, after "hook;" insert --and--; line 23, delete "; and" and insert therefor a period --.--; lines 24 through 27, delete in their entirety.

Signed and sealed this 4th day of June 1974.

(SEAL)
Attest:

EDWARD M. FLETCHER, JR.
Attesting Officer

C. MARSHALL DANN
Commissioner of Patents